US007765832B2

(12) United States Patent
Abraham et al.

(10) Patent No.: US 7,765,832 B2
(45) Date of Patent: Aug. 3, 2010

(54) METHOD OF PRODUCING REFLECTORS FROM GLASS OR GLASS CERAMICS

(75) Inventors: Hans-Walter Abraham, Darmstadt (DE); Armin Zehner, Huehnstetten (DE); Gernot Frei, Bad Gandersheim (DE); Hans-Juergen Klein, Salzgitter (DE); Thomas Niklos, Griesheim (DE); Ulrich Zirfas, Bad Gandersheim (DE); Willi Mattheis, Mainz (DE)

(73) Assignee: Schott AG, Mainz (DE)

( * ) Notice: Subject to any disclaimer, the term of this patent is extended or adjusted under 35 U.S.C. 154(b) by 188 days.

(21) Appl. No.: 11/801,097

(22) Filed: May 8, 2007

(65) Prior Publication Data
US 2008/0174034 A1 Jul. 24, 2008

(30) Foreign Application Priority Data
Jan. 24, 2007 (EP) .................. 07001445

(51) Int. Cl.
*C03B 23/26* (2006.01)
*C03B 23/00* (2006.01)
*C03B 11/00* (2006.01)
(52) U.S. Cl. .......................... 65/102; 65/65
(58) Field of Classification Search ........... 65/102; 264/1.9; 362/341
See application file for complete search history.

(56) References Cited
U.S. PATENT DOCUMENTS

| | | | | |
|---|---|---|---|---|
| 2,394,116 A | * | 2/1946 | Snyder et al. | 65/65 |
| 5,213,603 A | * | 5/1993 | Giles et al. | 65/305 |
| 2004/0264200 A1 | | 12/2004 | Hirano et al. | |

OTHER PUBLICATIONS

Robert H. Doremus, "Glass Science", 1994, JohnWiley & Sons, Second Edition.*
Squall International, "History of quartz glass", Dec. 8, 2002, http://www.squallquartz.com/history.html.*

* cited by examiner

Primary Examiner—Steven P Griffin
Assistant Examiner—Cynthia Szewczyk
(74) Attorney, Agent, or Firm—Harness, Dickey & Pierce, P.L.C.

(57) ABSTRACT

The invention provides a method of producing reflectors from glass or glass ceramics comprising the steps of: molding a reflector being open to the outside and having a closed bottom in a mold at a temperature above the transformation temperature; placing the reflector in a recess of a holder; heating up the reflector in the area of its bottom; lifting the bottom of the reflector from below using a die; punching out at least one opening from the bottom by moving at least one plunger into at least one matching opening in the die.

23 Claims, 2 Drawing Sheets

METHOD OF PRODUCING REFLECTORS FROM GLASS OR GLASS CERAMICS

RELATED APPLICATION

This application claims foreign priority to European patent application 07 001 445.1 filed Jan. 24, 2007, the subject matter of which is fully incorporated herein by reference.

BACKGROUND OF THE INVENTION

The present invention relates to a method of producing reflectors from glass or glass ceramics wherein a reflector being open to the outside having a closed bottom is molded in a mold at a temperature above the transformation temperature and an opening is then punched out from the bottom.

A method of that kind is known from US 2004/0264200 A1.

A reflector consisting of glass is initially produced in this case by molding a gob in a mold whereafter its bottom area is heated up locally using a burner so that an opening can then be punched out from the bottom, in the softened state of the glass, using a ram and a die. The reflector is then fire-polished to make the surface sufficiently smooth.

Alternatively, the opening in the bottom area can be produced by drilling. In that case as well, a fire-polishing step is carried out subsequently in order to produce a smooth surface.

It has been found that while a smooth surface is guaranteed in the bottom area of reflectors that have been produced according to the known method, the tolerances regarding the opening produced frequently cannot be maintained without a secondary treatment.

SUMMARY OF THE INVENTION

In view of this it is a first object of the present invention to disclose a method of producing reflectors from glass or glass ceramics which permits openings to be produced in the bottom region with sufficient precision.

It is a second object of the invention to disclose a method of producing reflectors from glass or glass ceramics which permits openings to be produced in the bottom region without any subsequent treatment.

It is a third object of the invention to disclose a method of producing reflectors from glass or glass ceramics which permits openings to be produced in the bottom region, wherein the method is suitable for a mass production.

These and other objects are achieved according to the invention by a method for producing reflectors from glass or glass ceramics that comprises the following steps:
  molding a reflector being open to the outside and having a closed bottom in a mold at a temperature above transformation temperature;
  placing the reflector in an opening of a holder;
  heating up the reflector in the area of its bottom;
  lifting the bottom of the reflector from below using a die;
  punching out at least one opening from the bottom by moving at least one plunger into at least one matching opening in the die.

The object of the invention thereby is perfectly achieved.

By lifting the bottom from below using a die before the opening is punched out it is ensured that no gap can form between the bottom of the reflector and the die.

It is thus ensured that during the subsequent punching operation no glass filaments will be drawn, which otherwise could occur if small gaps were left between the reflector bottom and the surface of the die. This guarantees the precision of the opening to be punched.

According to an advantageous further development of the invention, the reflector is supported laterally on the die in the area of its bottom while the reflector is lifted by the die.

This permits the position of the opening to be punched out from the reflector to be controlled even more precisely.

According to a preferred further development of the invention the reflector is supported laterally on holding elements that project from the die in upward direction.

Having the holding elements connected with the die in this way ensures in an easy way that the reflector will automatically be supported laterally and centered as it is lifted by the die from below.

This guarantees especially correct positioning of the opening so punched out.

To the extent the reflector comprises a pot-shaped bottom, the latter preferably is held laterally, during the step of lifting the reflector by means of the die, by its contact with rod-shaped holding elements mounted on the die.

This guarantees easy and reliable support by the holding elements.

Preferably, the rod-shaped holding elements used for this purpose are carbide metal pins.

In this way, premature wear of the holding elements under the action of glass that has been heated beyond its softening point can be largely prevented.

In the step of lifting the reflector bottom by the die, the latter preferably is lifted by a small amount only, namely by an amount of between 0.1 and 3 mm, preferably between 0.1 and 2 mm, more preferably between 0.1 and 1 mm, most preferably between 0.1 und 0.5 mm.

Lifting the die by such a small amount only guarantees precise contact of the die with the reflector bottom and counteracts at the same time any instability of the reflector that may be produced by the lifting action.

According to a further embodiment of the invention, the reflector is lifted off the opening of the holder while it is lifted by the die, being merely supported on the die laterally, in the area of its bottom.

In this case, the position of the opening to be punched out from the reflector bottom is exclusively defined by the die and the holding elements connected with it so that especially high precision is obtained with respect to the position of the openings to be punched out from the reflector bottom.

According to a further embodiment of the invention, a die urges the reflector against an abutment, preferably in the form of a plate, during the lifting step.

It is possible in this way to bring the spacing between the upper end of the reflector and the reflector bottom precisely to a nominal dimension without any need for a secondary treatment, for example in the form of a grinding step. Possible tolerances are balanced out in this case in the bottom area by a minimum amount of lateral migration of the material; this is, however, not a disadvantage as larger tolerances are allowed in a direction transverse to the longitudinal axis of the reflector. Thus, the predefined tolerances are precisely adhered to in the longitudinal direction of the reflector in spite of a simplified production process.

Prior to punching out the opening from its bottom, the reflector is heated up preferably in the area of its bottom using a burner with a heating-up rate of at least 100 K/s, preferably of at least 200 K/s, more preferably of at least 300 K/s, to a temperature clearly above the transformation temperature $T_g$ at which the material is sufficiently soft to permit punching of the opening(s).

Preferably, the reflector is heated up locally in the area of its bottom to a temperature of 700 to 1000° Celsius, preferably in the range of 800-1000° Celsius, more preferably in the range of 850 to 950° Celsius, using a burner.

Depending on the composition of the glass used or the glass ceramics used, an optimum punching process is thus rendered possible without any risk of damage to the surface of the glass or the glass ceramics or any risk of glass filaments forming during the punching operation.

Following the production of the reflector by molding, the reflector preferably is removed from the mold in hot condition, for example by means of a handling device, and is placed into the opening of a holder.

Thereafter, preferably a burner, being directed against the bottom of the reflector from below, is used for heating.

Preferably, a $H_2O_2$ burner is used for heating. Using a burner of that type, very targeted heating of the bottom area of the reflector can be achieved within a minimum of time, which on the one hand reduces the processing time and on the other hand prevents the reflector as such from being heated in the area of its optically effective inner surface and, accordingly, from becoming distorted.

It is understood that the features of the invention mentioned above and those yet to be explained below can be used not only in the respective combination indicated, but also in other combinations or in isolation, without leaving the scope of the present invention.

BRIEF DESCRIPTION OF THE DRAWINGS

Further features and advantages of the invention will become apparent from the detailed description of preferred embodiments given with reference to the drawings. In the drawings.

DETAILED DESCRIPTION OF THE PREFERRED EMBODIMENTS

The method according to the invention is suited for producing reflectors from glass or glass ceramics, especially such used for illumination purposes with high-energy light sources, for example for beamers or the like. As such reflectors are exposed to high thermal loading and precise tolerance control is simultaneously required, they lately have been produced from glasses or glass ceramics which in most of the cases have a thermal coefficient of expansion in the range of approximately $30\text{-}45 \times 10^{-7}/K$ and offer sufficient thermal resistance of up to 600° Celsius or more. After production, the inner surface of such reflectors is coated with a suitable material, such as aluminum, and can then be used for example as light-reflecting means for high-energy light sources.

The invention now discloses that opening(s) to be produced in the bottom of such a reflector are made by punching them out from the softened material, with special process control guaranteeing very precise tolerances and high surface quality.

According to the method of the invention, a reflector of this kind is initially produced from a gob by a conventional molding operation. In principle, all glass types that meet the specifications for such a reflector made from glass or glass ceramics are suited as starting material for the reflector. Generally, the transformation temperature $T_g$ is at least 550° Celsius.

Figure 1:
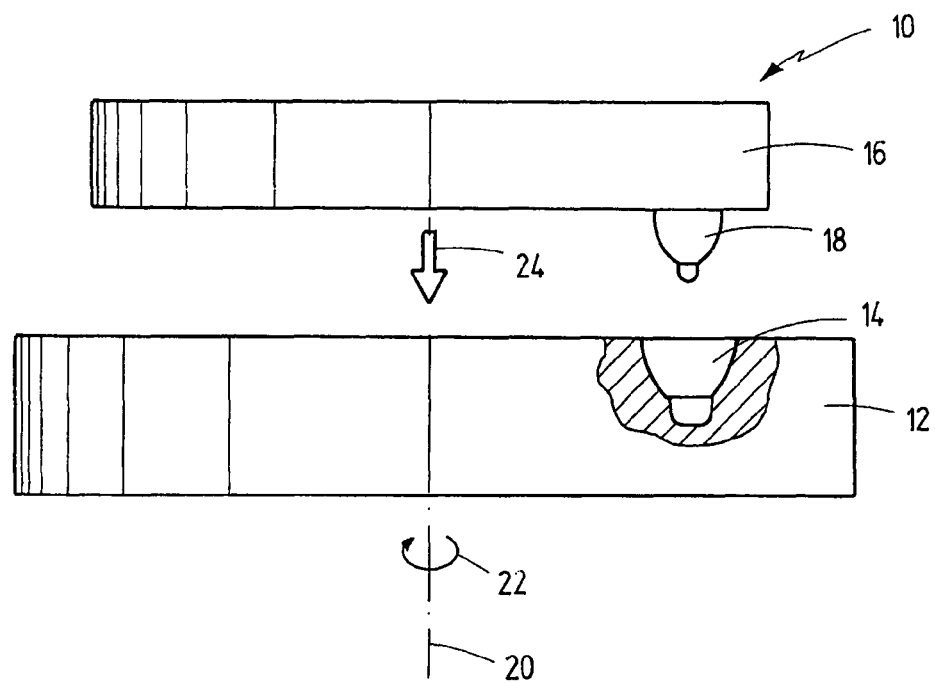
FIG. 1 shows a schematic sketch illustrating the production of a reflector from a gob by a molding operation.

FIG. 1 shows a molding device for the production of reflectors, indicated generally by reference numeral 10, comprising a circular disk 12 in which a plurality of cavities 14 is provided and which can be rotated about a rotary axis 20, as indicated by arrow 22. A compression mold 16 is provided with a matching ram 18. The compression mold 16 can be moved toward the circular disc 12, in the direction of arrow 24, for producing from a gob placed in a cavity 14 a glass product of the desired shape of a reflector. By rotating the circular disc 12 it is thus possible to mold a series of reflectors in the different cavities 14 of the circular disc 12, after a gob has been placed in each of the cavities 14 using an associated handling device.

The molding operation is carried out in the known way at a temperature clearly above transformation temperature in a range where the respective glass matrix has sufficiently softened.

While during the molding operation the shape of the reflector inside can be imaged with sufficient precision so that no complex reworking of the inner surface 32 will be needed, the openings required in the bottom area cannot, however, be produced with sufficient precision during the molding operation.

Figure 2:
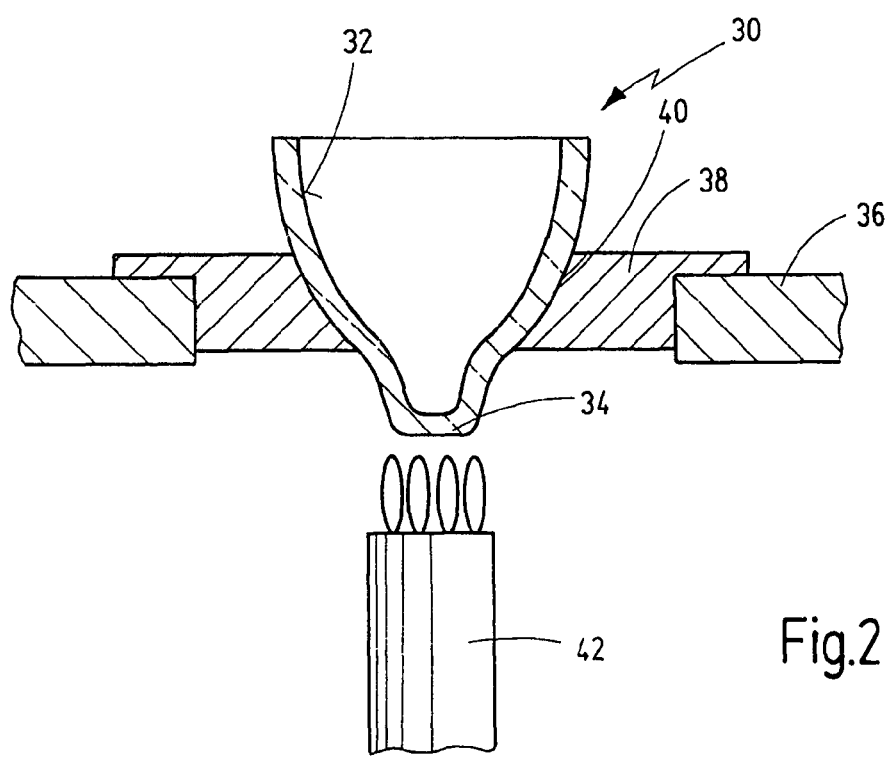
FIG. 2 shows a reflector in an enlarged cross-sectioned view, placed in an opening of a holder, with an associated burner intended to locally heat the bottom area.

The reflectors are therefore removed in still hot condition, immediately after their production, using a suitable handling device and are placed in a suitable holder 38, as shown in FIG. 2. The holder 38 consists of a plate 38 which is held in a supporting table 36 and is provided with an opening 40 adapted to the contour of the outer surface of the reflector 30. In a second process step, a reflector 30 placed in the holder 38 in still hot condition is then purposefully heated from below in the area of its pot-shaped bottom 34, using a $H_2O_2$ burner 42. The burner 42 used is one with very high burner capacity and permits the reflector to be heated up again within a very short time from a temperature in the range of approximately 500° Celsius to a red heat range, i.e. to a temperature in the order of approximately 900° Celsius, in less than one second, for example in 0.8 seconds.

Figure 3:
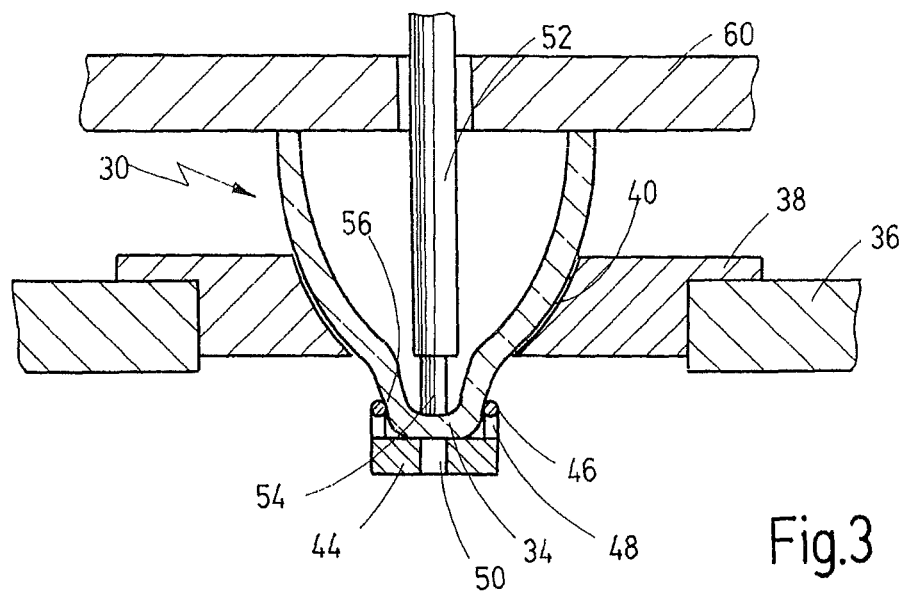
FIG. 3 shows a sectioned view of the reflector illustrated in FIG. 2, illustrating the next step in which the reflector is lifted from below using a die.

Thereafter, the supporting table 36 is moved on, and the at least one opening in the bottom 34 of the reflector 30 is produced by a punching operation in a next step explained in more detail in FIG. 3. To this end, a die 44 is urged against the pot-shaped bottom 34 from below so that the reflector is lifted by a small amount of, as a rule, between 0.1 and 1 mm.

During that operation, a plate 60 may be used as contact surface for the reflector 30 on the outside of the reflector 30, as shown in FIG. 3. As the reflector 30, being lifted by the die 44, tends to be lifted off its support in the opening 40 of the holder 38, precise positioning of the reflector 30 is to be achieved by holding elements 46 that support the pot-shaped bottom 34 of the reflector 30 over an area 56, preferably over approximately one third of the bottom 34.

These holding elements 46, being preferably designed as carbide metal pins and being directly mounted on the die 44 via supporting arms 48, serve to laterally support and to precisely position the reflector 30 as it is lifted by the die 44.

This guarantees precise positioning of the opening(s) to be punched out during a subsequent punching operation.

The die 44 is provided with one or more opening(s), corresponding to the opening(s) in the reflector bottom to be punched out, and a punching section 54 of one or more associated rams 52 can be run down into each of such openings for punching out the opening or the openings from the bottom 34 of the reflector 30.

The punching operation is effected using a die 44 of carbide metal having a sharp-edged punching section 54. A certain play of a few tenths of a millimeter is used between the punching section 54 and the associated opening 50 of the die 44. The contact between the upper end of the reflector 30 and the plate 60 as the die 44 is lifted from below guarantees that a precise dimension is maintained between the upper end of the reflector 30 and the lower end of the reflector bottom 34, as the material, having been softened before, will yield laterally to balance out any deviation. At the same time, this arrangement contributes toward exactly positioning the reflector 30. Further, pressing the die 44 against the reflector bottom 34 from below ensures that no glass threads will be formed during the punching operation.

If necessary, the die 44 and/or the ram 52 may be cooled in addition.

In the arrangement illustrated in FIG. 3, holding elements 46 are arranged one opposite the other so that a total of four holding elements are provided.

Figure 5:
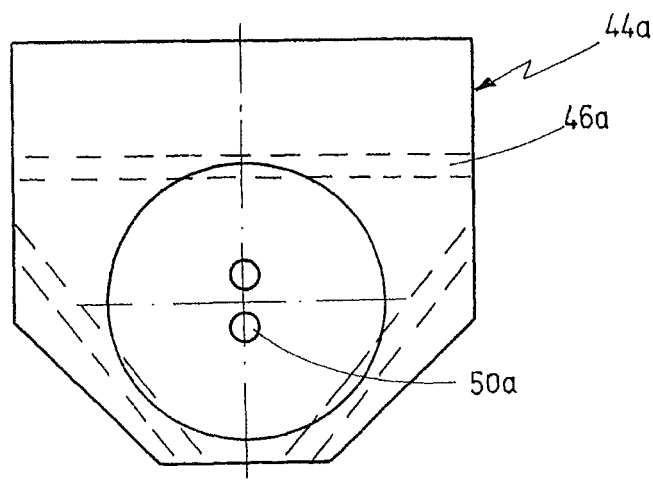
FIG. 5 shows a top view of an alternate design of a die with associated holding elements, designed for punching out two openings, arranged one beside the other, from the bottom of a reflector.

Alternatively, it is also possible, for example, to use three holding elements 46a arranged in triangular configuration, as shown in FIG. 5. FIG. 5 shows a top view of a correspondingly designed die 44a in which three carbide metal pins serving as holding elements 46a are arranged in triangular configuration. Contrary to the die 44 shown in FIG. 3, the die 44a comprises two openings 50a so that two openings arranged one beside the other can be punched out from the bottom 34 of the reflector 30 in one punching operation.

Figure 4:
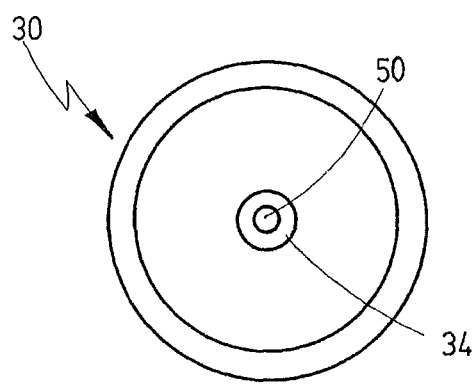
FIG. 4 shows a top view of the reflector illustrated in FIG. 3, after a central opening has been punched out from the bottom.

FIG. 4 shows a top view of the reflector 30 after one opening 50 has been punched out from the bottom 34.

It is understood that the form of the reflector 30 shown in the drawing is given by way of example only and that the method according to the invention can be used irrespective of the form of the respective reflector 30.

Further, the method according to the invention is largely independent of the type of material used for the glass or glass ceramics, provided the operation is carried out in a suitable temperature and/or viscosity range.

The invention claimed is:

1. A method of producing reflectors from glass or glass ceramics comprising the steps of:
   providing a mold comprising an upper mold part and a lower mold part defining a cavity in between and being movable relative to each other, said cavity having the shape of a reflector having a closed bottom and being open to the outside;
   placing a glass mass within said mold;
   molding a reflector at a temperature above the transformation temperature of the reflector by moving at least one of said upper and lower molds against the other one of said upper and lower molds;
   providing a holder comprising an opening;
   removing said reflector from said mold and placing said reflector within said opening of said holder;
   heating up said reflector in a region of its bottom;
   placing a die below said bottom of said reflector;
   lifting said bottom of said reflector by raising said die while supporting said bottom laterally on holding elements projecting from said die in an upward direction so that the reflector is not supported by the holder;
   providing a plunger being movable against said bottom toward said die; and
   thereafter punching at least one opening into said bottom by moving said plunger toward said die into a matching opening provided within said die.

2. The method of claim 1, wherein said reflector comprises a pot-shaped bottom and is held laterally, in its pot-shaped bottom region, by contacting rod-shaped holding elements mounted on said die.

3. The method of claim 2, wherein said step of holding said pot-shaped bottom laterally comprises providing carbide metal pins for contacting said pot-shaped bottom region.

4. The method of claim 2, wherein the reflector is heated in its bottom region by a $H_2O_2$ burner.

5. The method of claim 1, wherein said die is lifted for raising said reflector by an amount of between 0.1 and 0.5 mm.

6. The method of claim 1, wherein said reflector is lifted off said opening of said holder while being lifted by said die being merely supported on said die in said bottom region.

7. The method of claim 1, wherein said reflector is urged against an abutment while being lifted by said die.

8. The method of claim 7, wherein said reflector is urged against a plate while being lifted by said die.

9. The method of claim 1, wherein said reflector is heated up in its bottom region with a heating-up rate of at least 100 K/s.

10. The method of claim 1, wherein said reflector is heated up in its bottom region using a burner with a heating-up rate of at least 300 K/s.

11. The method of claim 1, wherein said reflector is heated up in its bottom region to a temperature of 700 to 1000° Celsius.

12. The method of claim 1, wherein said reflector is heated up in its bottom region to a temperature of 850 to 950° Celsius.

13. The method of claim 1, wherein said reflector, following its shaping during said molding step, is removed from said mold and placed into the opening of said holder in a hot condition.

14. The method of claim 1, wherein a burner is used for heating, the burner comprising a flame that is directed against said bottom of said reflector from below.

15. The method of claim 1, wherein said reflector has an open end opposite said closed bottom, and further including the step of providing a plate above said reflector after said reflector is placed within the opening of said holder, and further wherein during said lifting step the open end of said reflector is urged against said plate.

16. The method of claim 15, wherein said reflector is placed within the opening of said holder so that the reflector is supported by said opening of said holder and the bottom of said reflector extends through the opening, and further wherein during said lifting step the reflector is raised off of said opening of said holder.

17. A method of producing reflectors from glass or glass ceramics comprising the steps of:
   providing a mold comprising an upper mold part and a lower mold part defining a cavity inbetween and being moveable relative to each other, said cavity having the shape of a reflector having a closed bottom and being open to the outside;
   placing a glass mass within said mold;
   molding a reflector at a temperature above the transformation temperature of the reflector by moving at least one of said upper and lower molds against the other one of said upper and lower molds;

providing a holder comprising an opening;

removing said reflector from said mold and placing said reflector within said opening of said holder;

heating up said reflector in a region of its bottom;

placing a die below said bottom of said reflector;

lifting said bottom of said reflector by raising said die by an amount of between 0.1 and 3 mm while supporting said bottom laterally on holding elements projecting from said die in an upward direction so that the reflector is not supported by the holder;

providing a plunger being moveable against said bottom toward said die; and thereafter punching at least one opening into said bottom by moving said plunger toward said die into a matching opening provided within said die.

18. A method of producing reflectors from glass or glass ceramics comprising the steps of:

providing a mold comprising an upper mold part and a lower mold part defining a cavity inbetween and being movable relative to each other, said cavity having a shape of a reflector having a closed bottom and being open to the outside;

placing a glass mass within said mold;

molding a reflector at a temperature above the transformation temperature of the reflector by moving at least one of said upper and lower molds against the other one of said upper and lower molds;

providing a holder comprising an opening;

removing said reflector from said mold and placing said reflector within said opening of said holder;

heating up said reflector in a region of its bottom;

placing a die below said bottom of said reflector;

lifting said bottom of said reflector by raising said die so that the reflector is not supported by the holder;

providing a plunger being movable against said bottom toward said die; and thereafter punching at least one opening into said bottom by moving said plunger toward said die into a matching opening provided within said die.

19. The method of claim 18, wherein said reflector is supported laterally on said die in a bottom region while being lifted by said die.

20. The method of claim 18, wherein said reflector is heated up in its bottom region with a heating-up rate of at least 100 K/s.

21. The method of claim 18, wherein said reflector has an open end opposite said closed bottom, and further including the step of providing a plate above said reflector after said reflector is placed within the opening of said holder, and further wherein during said lifting step the open end of said reflector is urged against said plate.

22. The method of claim 21, wherein said reflector is placed within the opening of said holder so that the reflector is supported by said opening of said holder and the bottom of said reflector extends through the opening, and further wherein during said lifting step the reflector is raised off of said opening of said holder.

23. A method of producing reflectors from glass or glass ceramics comprising the steps of:

providing a mold comprising an upper mold part and a lower mold part defining a cavity inbetween and being moveable relative to each other, said cavity having a shape of a reflector having a closed bottom and being open to the outside;

placing a glass mass within said mold;

molding a reflector at a temperature above the transformation temperature of the reflector by moving at least one of said upper and lower molds against the other one of said upper and lower molds;

providing a holder comprising an opening;

removing said reflector from said mold and placing said reflector within said opening of said holder;

heating up said reflector in a region of its bottom;

placing a die below said bottom of said reflector;

lifting said bottom of said reflector by raising said die by an amount of between 0.1 and 3 mm so that the reflector is not supported by the holder;

providing a plunger being moveable against said bottom toward said die; and thereafter punching at least one opening into said bottom by moving said plunger toward said die into a matching opening provided within said die.

* * * * *